United States Patent [19]

Frederiksen

[11] Patent Number: 5,787,830
[45] Date of Patent: Aug. 4, 1998

[54] SAIL SLIDE

[76] Inventor: Gert Hans Frederiksen, 187, Ibækvej, DK-8700 Vejle, Denmark

[21] Appl. No.: 863,559

[22] Filed: May 27, 1997

Related U.S. Application Data

[63] Continuation of Ser. No. 501,038, filed as PCT/DK94/00080, Aug. 9, 1995 published as WO94/19615, Sep. 1, 1994, abandoned.

[30] Foreign Application Priority Data

Feb. 26, 1993 [DK] Denmark .................... 0217/93

[51] Int. Cl.$^6$ .................................... B63H 9/04
[52] U.S. Cl. .................................... 114/104; 114/105
[58] Field of Search .................... 114/39.1, 90, 102, 114/103, 104, 108, 105, 112

[56] References Cited

U.S. PATENT DOCUMENTS

| | | |
|---|---|---|
| 4,452,164 | 6/1984 | Dejager .................... 114/112 |
| 4,692,037 | 9/1987 | Kasai . | |
| 5,127,351 | 7/1992 | Breems .................... 114/112 |
| 5,191,851 | 3/1993 | Rutgerson .................... 114/102 |

FOREIGN PATENT DOCUMENTS

| | | |
|---|---|---|
| 611838 | 10/1926 | France . |
| 2423173 | 11/1975 | Germany . |
| 3705372 | 9/1987 | Germany . |

*Primary Examiner*—Stephen Avila
*Attorney, Agent, or Firm*—Rothwell, Figg, Ernst & Kruz, P.C.

[57] ABSTRACT

A track slide intended to be moved along a track, particularly a mast or boom, having a groove with an enlarged inner portion and a narrow slot defined by two opposite walls of the track. The slide comprises a central profiled member having an enlarged inner portion for being received in the enlarged inner portion of the groove and a shaft portion for extending through the slot. Furthermore the slide comprises a roller member for coacting with the outer face of the opposite side walls on each side of the groove. The roller member is formed of a plurality of roller bodies arranged to rotate freely in a circumferential continuous path with an outwardly open, longitudinal slot and a return passage on each side of the central profiled member. The use of freely rotating roller bodies ensures a relatively small rolling resistance in all situations, even if the slide should tilt in a relation to the track. Moreover, the plurality of roller bodies ensures that the load on the wall portion, on which the roller bodies roll, is within an acceptable level.

6 Claims, 4 Drawing Sheets

SAIL SLIDE

This is a continuation of application Ser. No. 08/501,038, filed as PCT/DK94/00080, Aug. 9, 1995 published as WO94/19615, Sep. 1, 1994 now abandoned.

TECHNICAL FIELD

The present invention relates to a sail slide intended to be moved along a sailing boat mast having a groove with an enlarged inner portion and a narrow slot defined by two opposite walls of the mast, said slide comprising a central profiled member having an enlarged inner portion for being received in the enlarged inner portion of the groove and a shaft portion for extending through the slot and a roller member for coacting with an edge portion of the opposite side walls on each side of the slot.

BACKGROUND ART

SE published specification No. 460.353 discloses a slide of the above type intended to be moved along a groove of the mast of a sailing boat. The sail slide comprises a shaft portion extending through the slot of the groove and an inner transverse shaft provided with a wheel at each end, said wheel rolling on the inner face of the opposite walls forming the slot. At the outer end portion of the shaft, a second shaft is arranged being provided with a wheel at each end, said wheel intended to roll on the outer face of the said wall portions defining the slot of the groove.

Moreover, DE published specification No. 24 23 173 and FR Pat. No. 611.838 discloses the use of slides having pairs of rotatably arranged wheels on a shaft and intended to be received in the groove and to roll on the wall portions thereof.

The drawback of known sail slides provided with wheels is that it is not always possible to move or roll these along the mast in a sufficiently easy manner, as they tend to jam. Furthermore, they cause a relatively heavy local load on the coacting wall portions.

DISCLOSURE OF THE INVENTION

The object of the invention is to provide a sail slide of the type stated in the introduction which is moved very easily along the mast with which it coacts.

For obtaining said object the sail slide according to the invention is characterised in that the roller member is formed of a plurality of balls arranged to rotate freely in a circumferential continuous path with an outwardly open, longitudinal slot and a return passage on each side of the central profiled member. By using balls arranged in a continuous path, a relatively small rolling resistance is obtained, when the slide is subjected to thrust load, even if the slide tilts slightly in relation to the groove. Further, as the rolling resistance of said balls is completely independent of the rolling direction so that an inclined positioning of the slide has no influence on ability of the slide to be moved along the mast. Moreover, the plurality of balls ensures that the load on the wall portions, on which the balls roll, is within an acceptable level.

According to the invention, in this connection the central profiled member is provided with a second roller member for coacting with the inner face of the opposite side walls, the second roller member being formed of a plurality of roller bodies arranged to rotate freely in a circumferential continuous path having an outwardly open, longitudinal slot and a return passage on each side of the longitudinal mid-plane of the slide. As a result, the slide may also offer a low rolling resistance, when it is subjected to tensile stress, for which reason it is advantageous to use the slide for many purposes, for instance as a traveller car.

Furthermore, according to the invention, the central profiled member may in its shaft portion be provided with a third roller member formed by a plurality of roller bodies arranged to rotate freely in a circumferential continuous path having an outwardly open, longitudinal slot on each side of the shaft portion, the roller bodies therein being intended to roll on one of the edge portions forming the slot of the two adjacent side walls. By this embodiment, a further reduction of the rolling resistance is obtained, as no faces of the slide is in sliding friction with the coacting track.

Moreover, according to the invention, the second and the third roller member may be formed of balls.

Furthermore, according to the invention, the open slot of each path may have an essentially semi-circular cross-section, whereby an optimum transfer of the forces between the balls and the slot is obtained.

Moreover, according to the invention, when the roller bodies are balls, the slot of each path may have a depth at least slightly larger than half the diameter of the balls and provided with opposite edge portions extending slightly inwardly to form a slot opening being smaller than the diameter of the balls. As a result, most advantageously the balls are retained in the open slot in such a manner that they do not fall out when the sail slide does not coact with the track.

Furthermore, according to the invention the distance between each of the upper return passage may be less than the distance between the open slots of the path, whereby a more compact and a lower overall height of the sail slide is obtained than when the open slot and the return passage is arranged in superposition.

Finally, according to the invention the two upper return passages may be arranged mutually adjacent, whereby an optimum compactness and minimum height of the sail slide is obtained.

BRIEF DESCRIPTION OF THE DRAWINGS

The invention is described in greater detail in the following with reference to the drawing illustrating an embodiment of the invention according to the invention in form of a sail slide intended to be moved along the groove of a mast of a sailing boat, and in which.

BEST MODE FOR CARRYING OUT THE INVENTION

Figure 1:
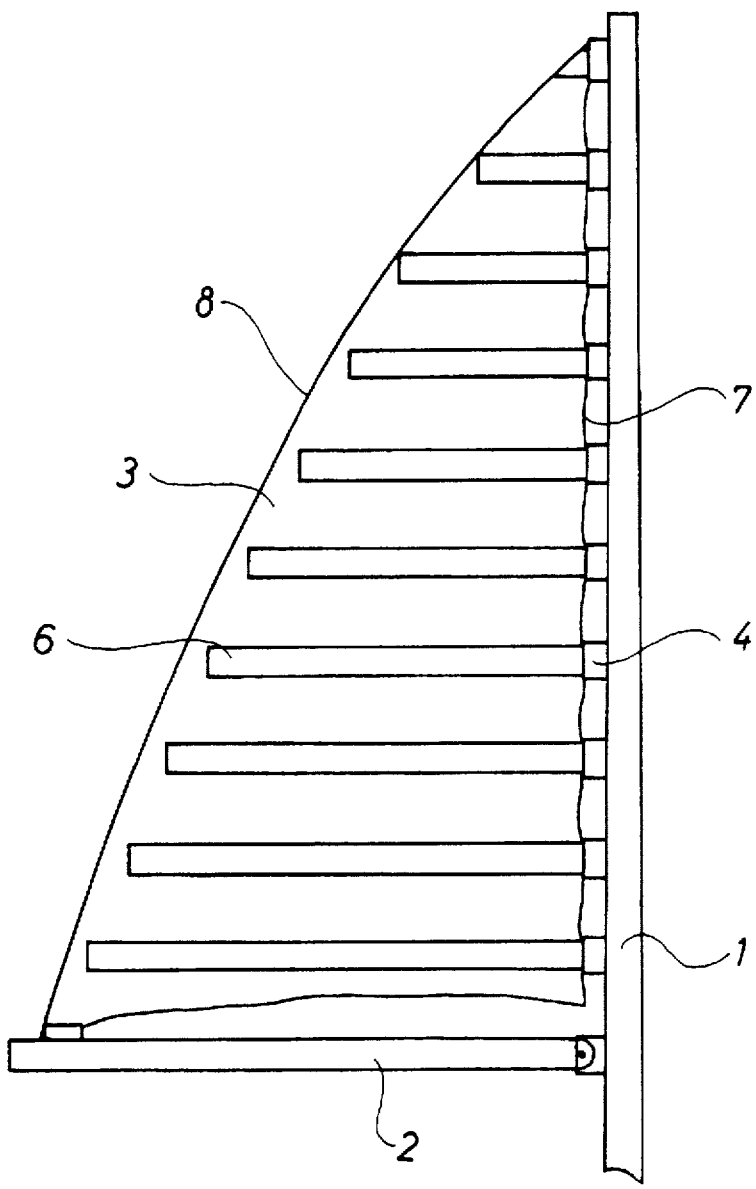
FIG. 1 is a diagrammatic side elevational view of a mast of a sailing boat, along which sail slides according to the invention are movably arranged.

FIG. 1 illustrates a mast 1 with a boom 2 and mainsail 3. The mainsail 3 is attached to the mast 1 by means of a plurality of sail slides 4 according to the invention movable along the guideway or groove 5 of the mast 1, as it also appears from FIG. 2. The mainsail 3 is provided with through-going battens 6, i.e battens extending essentially from the luff 7 of the mainsail to the after leech rope 8 thereof. The battens are secured to the sail in a manner known per se and at the luff portion connected to each sail slide 4 by means of a batten fitting 9 and a pivot joint 10, wherein pivoting of the batten relative to the slide is permitted, essentially 110° to each side relative to amidships. When using through-going battens 6, the load on the sail is essentially transferred to the mast as thrust load, i.e. the sail slides 4 are essentially at any given time subjected to pressure load. As a rule, approximately 80% of the sail load is transferred as thrust load.

As it appears from FIGS. 2–5, the sail slide 4 comprises a slide body 11 of an essentially trapezoidal cross-section with a wide lower face 12 intended to turn towards the groove 5 and a narrow upper face intended to turn away from the groove when the slide 4 coacts therewith. The essentially trapezoidal slide body 11 has furthermore an essentially T-shaped projection 14 extending outwardly from the wide lower face 12. A sleeve 15 is arranged on the essentially T-shaped projection 14, said sleeve having an outer essentially T-shaped outline and being made from a material with a low coefficient of friction, such as a suitable plastics material. The T-shaped projection 14 and the sleeve 15 thus form a T-shaped member 16 having a large head received in the wide inner protion 18 of the groove 5 and a narrow shaft 19 extending through the narrow slot 20 of the groove 5. By means of the T-shaped member 16 of the sail slide 4, the slide 4 is prevented from leaving the groove 5.

Furthermore, on each side of the longitudinal mid-plane, the slide body is provided with a ball path 22 comprising a slot 23 open towards the lower face 12 of the slide and a closed passage 24. The slot 23 and the passage 24 is interconnected to form the continuous path by means of connecting passages 40,41 in the end covers 25,26 attached to the slide body 11 at each end thereof. The connecting passages 40,41 are indicated by means of dotted lines in FIGS. 4 and 5. In each circumferential continuous path a plurality of balls 27 are arranged, which may rotate freely in the path. As it can be clearly seen from FIG. 2, the open slot has an essentially semicircular shape in a cross-sectional view. However, the depth H of the groove is slightly larger than half the diameter of the balls (D ½) and at least one of the edge portions 28 of the slot extends slightly inwards, the opening O of the slot thus being less than the diameter D of the balls, whereby the balls do not fall out, when the sail slide is removed from the track with which it is intended to coact.

Figure 2:
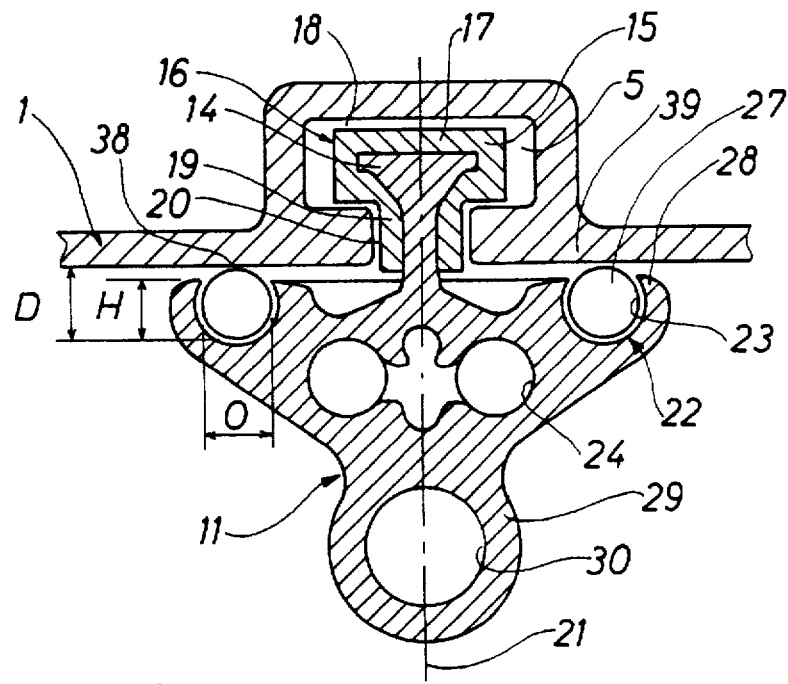
FIG. 2 is a sectional view through the mast in the area at its groove and of a sail slide according to the invention coacting therewith.
Figure 3:
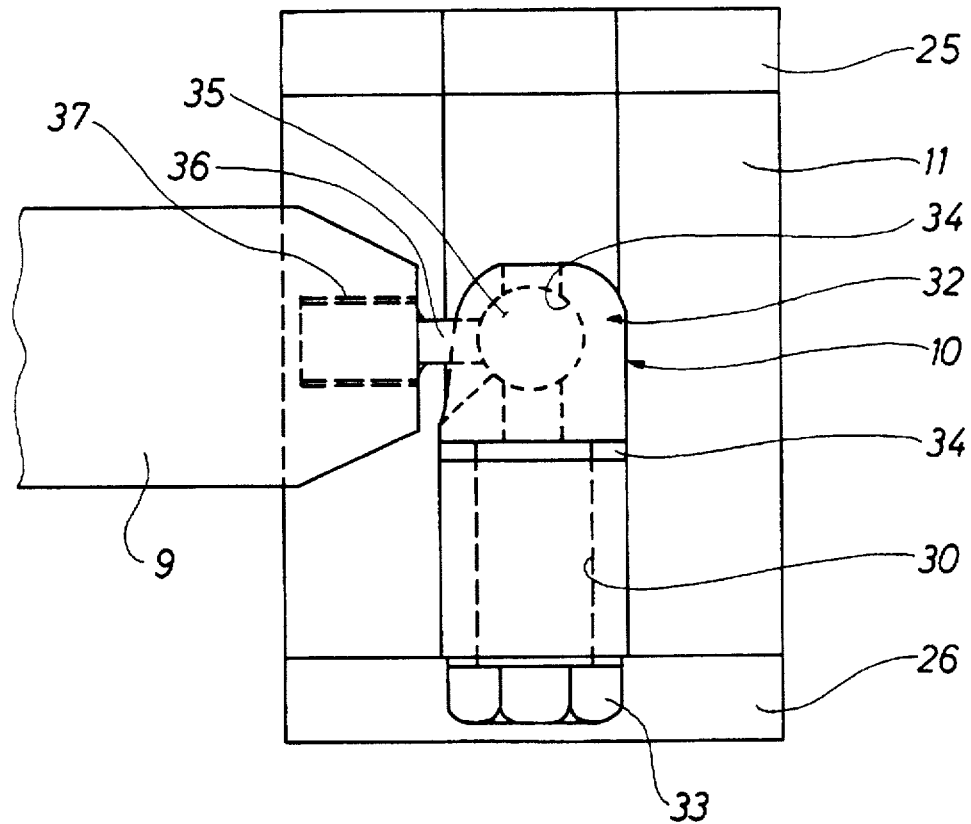
FIG. 3 is a front view of the sail slide according to the invention, i.e. in the direction towards the groove of the mast.
Figure 4:
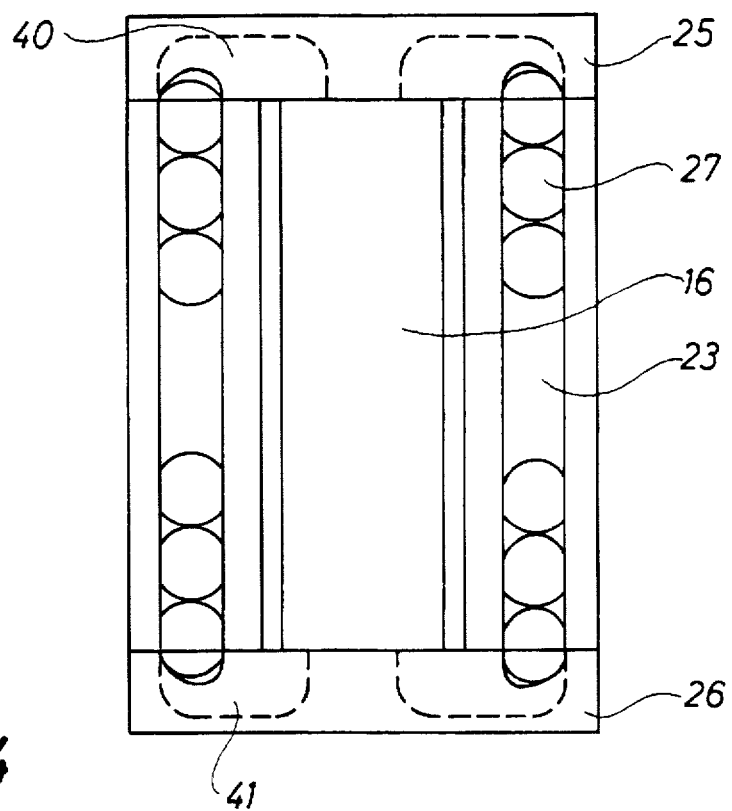
FIG. 4 is a view from below of the sail slide.
Figure 5:
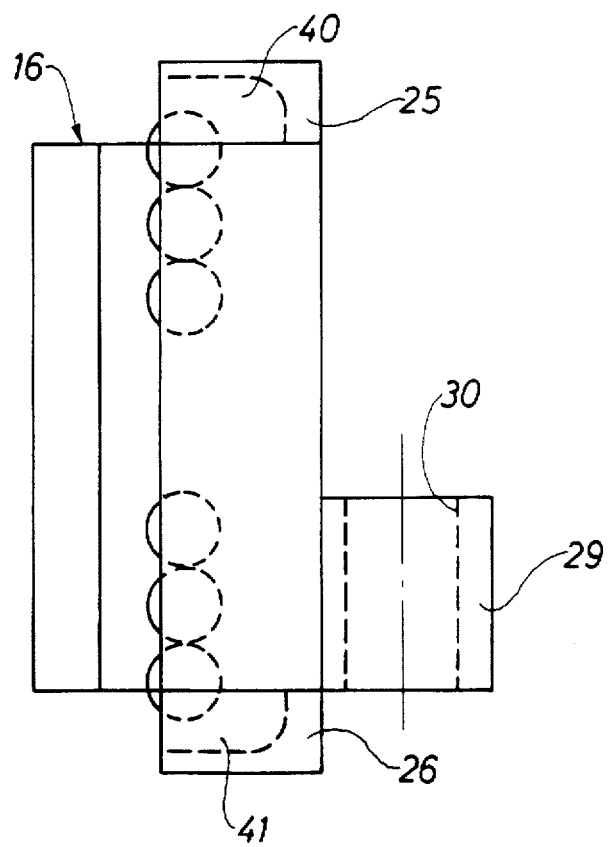
FIG. 5 is a side elevational view of the sail slide.

As it is evident from FIG. 2, the passages 24 are arranged closer to the longitudinal mid-plane of the slide body 11 than the open slots and preferably in close proximity of each other to obtain a low height of the slide 4.

As it furthermore appears from FIG. 2, when the slide 4 is moved along the mast 1, the balls 24 arranged in the open slots 23 roll on the outer face of the opposite wall portions 38,39 on each side of slot 20 of groove 5.

At the narrow upper face 13 the slide body 11 is provided with a bearing housing 29 extending over a portion of the length of the slide body and having a through-going cylindrical bore 30. In its entirety, the slide body 11 is preferably made of extruded aluminium, the extension of the bearing housing 29 being removed by machining. The bearing housing 29 forms part of the previously mentioned pivot joint 10 pivotally connecting the fitting 9 of the batten 6 with the slide 4. The pivot joint 10 comprises, furthermore, a shaft 31 being pivotally received in the bore 30 and having at one end an enlarged head 32 and at the other end a threaded portion, whereon a nut 33 is screwed. Between the enlarged head 32 of the shaft 31 and the bearing housing 29 a disc-shaped ring 34 is provided.

The head of the shaft forms one part of a ball-and-socket universal joint, viz the socket, wherein a freely rotating ball 34 is arranged, one end thereof being attached to a shaft 36, the other end of which having a thread 37 in engagement with a corresponding thread in the batten fitting 9, to which the batten 6 is secured.

Figure 6:
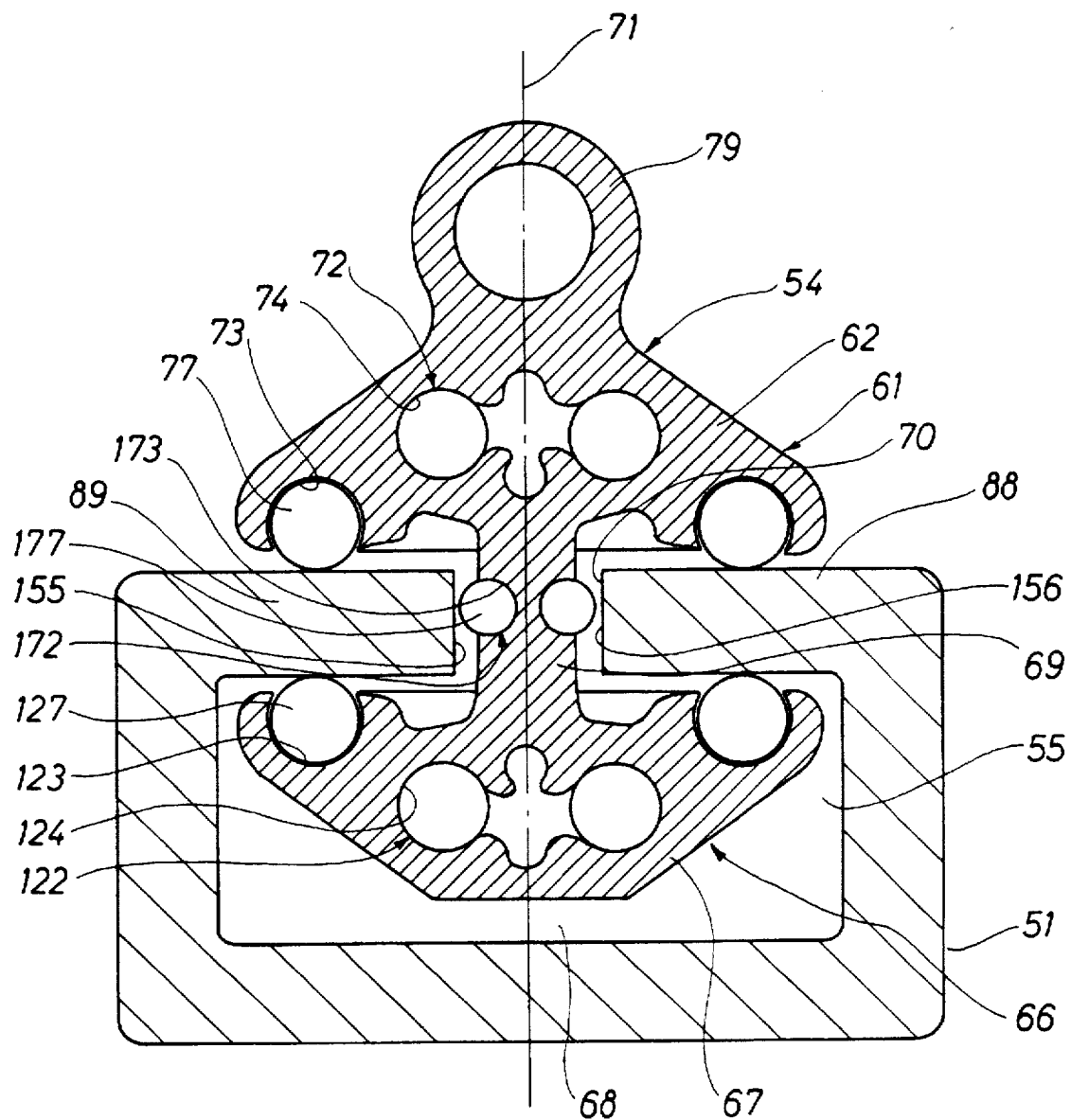
FIG. 6 is a sectional view through a second embodiment of the sail slide according to the invention in engagement with a profiled track of a C-shaped cross-section.

FIG. 6 shows cross-sectional view of a second embodiment of a sail slide 54 according to the invention in engagement with a track 51 with a C-shaped cross-section.

The track 51 thus forms a groove 55 having a wide inner portion 68 and a narrow slot 70. The sail slide 54 and the track 51 may typically be a traveller car and a sheet track. The sail slide 54 has a slide body 61 of extruded aluminium and comprises an outer body portion 62 intended to be arranged on the outer side of the track, when the slide is in engagement therewith, and an essentially T-shaped profiled member 66 extending into the groove 55. The T-shaped profiled member 66 comprises a large head 67 received in the wide inner portion 68 of the groove 55 and a narrow shaft 69 extending through the narrow slot 70 of the groove 55.

On each side of the longitudinal mid-plane, the outer body portion 62 of the slide body 61 is provided with a ball path 72 comprising a slot 73 open in the direction towards the track 51 and a closed passage 74. Each slot 73 and relating passage 74 is interconnected by means of connecting passages arranged in the end covers (not shown) attached to the slide body at each end thereof. In each circumferential continuous path 72 a plurality of balls 77 are arranged, which may rotate freely in the path. As described at the above embodiment, the slot is shaped in such manner that the ball cannot fall out. The balls 77 are intended to roll on the outer face of the wall portions 88,89 at the slot 70.

The enlarged head 67 of the slide body has essentially the same shape as the outer body portion 62 of the slide body and is thus, on each side of the longitudinal mid-plane 71 of the slide body, provided with a ball path 122 comprising a slot 123 open in the direction towards the outer slide body portion 62 and a closed passage 124. In a manner as described above, a plurality of balls 127, which may rotate freely, is arranged in the paths. The balls 127 in the longitudinal open slots 123 are in engagement with the inner face of the opposite wall portions 88,89 at the slot 70.

Moreover, a circumferential continuous path 152 is arranged in the narrow shaft 69 of the slide body 61, said path comprising an outwardly longitudinal open slot 171 in each side of the shaft 69. For the formation of the path the slots 173 are interconnected by means of connecting passages in each of end covers (not shown). In the ball path 172 a plurality of balls 177 is arranged intended to roll on one of two edge portions 155,156 forming the slot 70.

Finally, on the upper face of the outer body portion 62, the slide body 61 is provided with an eye 79 at each end to receive a shaft (not shown), whereto a shackle or a block may be secured.

The shape of the upper end of the outer body portion 62 is dependent on the purpose of the slide and may thus be designed in many various ways.

I claim:

1. A sail slide (4;54) intended to be moved along a sailing boat mast having a groove (5;55) with an enlarged inner portion (18;58) and a narrow slot (20;70) defined by two opposite walls (38,39;88,89) of the mast, said slide (4,54) comprising a central profiled member (16;66) having an enlarged inner portion (17,67) for being received in the enlarged inner portion (18;68) of the groove (5;55) and a shaft portion (19;69) for extending through the slot (20;70), and a roller member for coacting with the outer face of the opposite side walls (38,39;88,89) on each side of the slot, characterised in that the roller member is formed of a plurality of balls (27;77) arranged to rotate freely in a circumferential continuous path (22;72) with an outwardly open, longitudinal slot (23;73) and a return passage (24,74) on each side of the central profiled member (16;66);

wherein the central profiled member (66) is provided with a second roller member for coacting with the inner face of the opposite side walls (88,89), characterised in that the second roller member is formed of a plurality of roller bodies (127) arranged to rotate freely in a circumferential continuous path (122) having an outwardly open, longitudinal slot (123) and a return passage (124) on each side of the longitudinal mid-plane (71) of the slide (54); and wherein the central profiled member (66) in its shaft portion (69) is provided with a third roller member formed by a plurality of roller bodies (177) arranged to rotate freely in a circumferential continuous path (172) having an outwardly open, longitudinal slot (173) on each side of the shaft portion (6), the roller bodies therein (177) being intended to roll on one of the edge portions (156, 155) forming the slot (70) of the two adjacent side walls (88,89).

2. A slide as claimed in claim 1, characterized in that the roller bodies are formed of balls (127;177).

3. A slide as claimed in claim 2, characterised in that the slot (23;73;123;173) of each path (22;72;122;172) has an essentially semicircular cross-section.

4. A slide as claimed in claim 3, characterised in that the slot (23;73;123;173) of each path (22;72;122;172) has a depth (H) at least slightly larger than half the diameter (D ½) of the balls (27;77;127;177) and provided with opposite edge portions (28) extending slightly inwardly to form a slot opening (O) being smaller than the diameter (D) of the balls.

5. A sail slide (4;54) intended to be moved along a sailing boat mast having a groove (5;55) with an enlarged inner portion (18;58) and a narrow slot (20;70) defined by two opposite walls (38,39;88,89) of the mast, said slide (4,54) comprising a central profiled member (16;66) having an enlarged inner portion (17,67) for being received in the enlarged inner portion (18;68) of the groove (5;55) and a shaft portion (19;69) for extending through the slot (20;70), and a roller member for coacting with the outer face of the opposite side walls (38,39;88,89) on each side of the slot, characterized in that the roller member is formed of a plurality of balls (27;77) arranged to rotate freely in a circumferential continuous path (22;72) with an outwardly open, longitudinal slot (23;73) and a return passage (24,74) on each side of the central profiled member (16;66), characterized in that the slot (23;73;123;173) of each path (22;72;122;172) has an essentially semicircular cross-section.

6. A sail slide (4;54) intended to be moved along a sailing boat mast having a groove (5;55) with an enlarged inner portion (18;58) and a narrow slot (20;70) defined by two opposite walls (38,39;88,89) of the mast, said slide (4,54) comprising a central profiled member (16;66) having an enlarged inner portion (17,67) for being received in the enlarged inner portion (18;68) of the groove (5;55) and a shaft portion (19;69) for extending through the slot (20;70), and a roller member for coacting with the outer face of the opposite side walls (38,39;88,89) on each side of the slot, characterized in that the roller member is formed of a plurality of balls (27;77) arranged to rotate freely in a circumferential continuous path (22;72) with an outwardly open, longitudinal slot (23;73) and a return passage (24,74) on each side of the central profiled member (16;66), characterized in that the slot (23;73;123;173) of each path (22;72;122;172) has a depth (H) at least slightly larger than half the diameter (D ½) of the balls (27;77;127;177) and provided with opposite edge portions (28) extending slightly inwardly to form a slot opening (O) being smaller than the diameter (D) of the balls.

* * * * *